C. & F. WYSONG.
Corn-Planter.

No. 208,503.　　　　　　　　Patented Oct. 1, 1878.

Witnesses:
Chas. M. Peck
Wm Ritchie

Inventors:
Charles Wysong
Frederick Wysong
by their Attys.
Peck & Co

UNITED STATES PATENT OFFICE.

CHARLES WYSONG AND FREDRICK WYSONG, OF PYRMONT, OHIO.

IMPROVEMENT IN CORN-PLANTERS.

Specification forming part of Letters Patent No. 208,503, dated October 1, 1878; application filed August 2, 1877.

*To all whom it may concern:*

Be it known that we, CHARLES WYSONG and FREDRICK WYSONG, of Pyrmont, in the county of Montgomery and State of Ohio, have invented certain new and useful Improvements in Corn-Planters; and we do hereby declare the following to be a full, clear, and exact description of the same.

This invention relates to that class of corn-planters usually known as "check-row planters," in which devices upon the wheels indicate the point at which the grain will be deposited in the furrows.

Our improvements consist in the general construction of the machine, combining strength with simplicity of structure.

Figure 1:
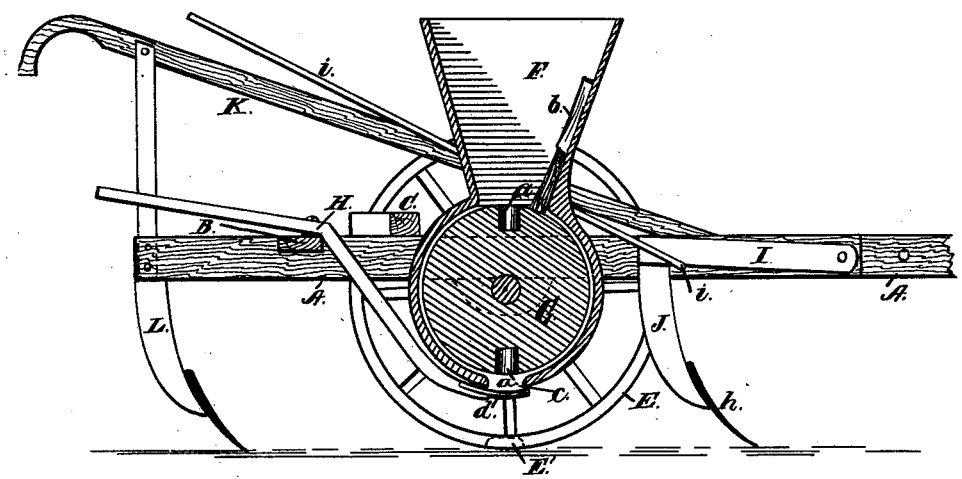
Figure 2:
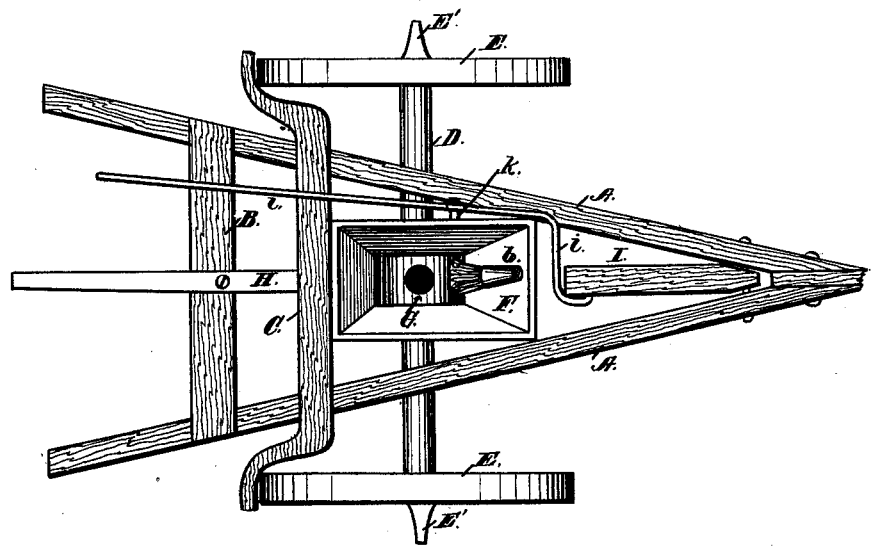

Figure 1 represents a central sectional view, in side elevation, of our improved corn-planter; and Fig. 2 is a plan view of the same with the handle omitted.

The frame-work of the machine consists of two convergent beams, A, bolted together in front and braced in the rear by the cross-beams B and C, of which the projecting ends of the latter form scrapers for the wheels. This frame-work rests upon the axle D, which is journaled in it, and is supported by the carriage-wheels E, keyed thereon.

Between the beams A, and secured thereto, is the hopper F, of the shape shown, and having a cylindrical case at its bottom, which is concentric with the axle. In this case, and keyed upon the axle, is a feeding-cylinder, G, having two diametrical recesses, $a$, in its periphery, sufficiently large to accommodate one or two grains of corn. Attached in any suitable manner to the inside front end of the hopper is a brush cut-off, $b$, of the usual or any proper construction.

In the bottom of the casing is an aperture, $c$, through which the grain falls from the recesses $a$ to the ground. Over this fits a gate, $d$, connected to a curved lever, H, pivoted upon the cross-beam B, and extended rearwardly, so as to be under control of the operator.

Upon the fellies of the wheels E are laterally-projecting lugs E', lying in the plane of the recesses $a$, and by means of which the operator can ascertain just when the corn will be deposited in the furrow.

When the furrows have been made across the field in one direction, and of a width just equal to half the periphery of the wheels E, it is only necessary for the operator to start with one of the lugs E' in the first furrow, and the corn will be deposited regularly in each of the others, thus maintaining regularity. The next row is formed by carefully guiding one of the wheels in one of its former tracks, taking care that the lugs E' tread in the furrows.

To obtain suitable depth, I pivot a beam, I, to which is attached a standard, J, and shovel $h$, between the forward ends of the beams A, as shown, and in line with the aperture $c$. The depth of penetration of this shovel is regulated by lever $i$, connected to the beam and pivoted to the side of the hopper at $k$, and extending to the rear, so as to be within reach of the operator.

From the rear of the beams A standards L project downward, and have attached to them shovels, which follow on each side of the furrow made by the shovel $h$.

The handles K are applied in any suitable manner.

By this arrangement of parts we obtain a corn-planter simple and efficient in structure and operation.

We claim as follows:

1. In a corn-planter, the adjustable beam I, pivoted at its front end between the forward ends of the beams A, and provided at its rear end with the standard and shovel J $h$, in combination with the bent lever $i$, pivoted to the side of the hopper, the several parts constructed and relatively arranged with each other substantially as herein shown and described.

2. In a corn-planter, the combination, with the hopper having a cylindrical bottom, with discharge-aperture $c$ and recessed feed-wheel G, of the curved and pivoted swinging lever H, provided with gate $d$, substantially as specified.

Witness our hands this 11th day of July, A. D. 1877.

CHARLES WYSONG.
FREDRICK WYSONG.

Witnesses:
P. H. GUNCKEL,
WM. RITCHIE.